United States Patent
Burago et al.

(10) Patent No.: US 7,242,404 B2
(45) Date of Patent: Jul. 10, 2007

(54) ENLARGEMENT OF FONT CHARACTERS

(75) Inventors: Andrei Burago, Kirkland, WA (US);
Sergey Genkin, Kirkland, WA (US);
Sergey Z. Malkin, Redmond, WA (US); Victor E. Kozyrev, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 57 days.

(21) Appl. No.: 11/228,447

(22) Filed: Sep. 15, 2005

(65) Prior Publication Data

US 2007/0057949 A1    Mar. 15, 2007

(51) Int. Cl.
*G09G 5/26* (2006.01)
(52) U.S. Cl. ............... 345/472.2; 345/467; 345/469.1; 345/469
(58) Field of Classification Search .............. None
See application file for complete search history.

(56) References Cited

U.S. PATENT DOCUMENTS

| | | | |
|---|---|---|---|
| 4,573,199 A | | 2/1986 | Chen et al. |
| 5,185,818 A | * | 2/1993 | Warnock .................... 382/112 |
| 5,398,306 A | * | 3/1995 | Karow ....................... 358/1.11 |
| 5,577,170 A | * | 11/1996 | Karow ....................... 358/1.11 |
| 5,579,416 A | | 11/1996 | Shibuya et al. |
| 5,946,001 A | * | 8/1999 | Isaka .......................... 345/470 |
| 6,201,553 B1 | * | 3/2001 | Morooka .................... 345/470 |
| 6,952,210 B1 | * | 10/2005 | Renner et al. .............. 345/471 |
| 7,057,617 B1 | | 6/2006 | Nishida |
| 2004/0008657 A1 | | 1/2004 | Lee et al. |
| 2005/0060138 A1 | * | 3/2005 | Wang et al. ................... 704/1 |
| 2005/0171735 A1 | * | 8/2005 | Huang ........................ 702/183 |
| 2006/0017733 A1 | * | 1/2006 | Matskewich et al. ....... 345/467 |

OTHER PUBLICATIONS

PCT Search Report for PCT/US2006/036254 dated Feb. 16, 2007.

* cited by examiner

*Primary Examiner*—Mark Zimmerman
*Assistant Examiner*—David Chu
(74) *Attorney, Agent, or Firm*—Merchant & Gould P.C.

(57) ABSTRACT

A character within a font is enlarged to a desired size by first determining whether the font contains existing or predefined variants of the character having the desired size. If no appropriately sized variant exists, the enlarged character is assembled from a plurality of component glyphs that are stored with the font, wherein the component glyphs include an extender that may be duplicated within the assembled character in order to achieve the desired size. In one embodiment, the font includes tables containing records of the enlarged variants for a particular character, as well as part records for the component glyphs used to assemble the enlarged character.

15 Claims, 7 Drawing Sheets

102 → $f(x) = \{$ 104 $\begin{array}{l} x, \quad x \leq 0 \\ \dfrac{x}{3}, \quad 0 < x \leq 33 \\ \sqrt[3]{x}, 33 < x \end{array}$

Fig. 1A

112 → $f(x) = \begin{cases} x, & x \leq 0 \\ \dfrac{x}{3}, & 0 < x \leq 33 \\ \sqrt[3]{x}, & 33 < x \end{cases}$
114

Fig. 1B

ENLARGEMENT OF FONT CHARACTERS

BACKGROUND

Software applications such as word processors, spreadsheet programs and/or formula editors require the ability to display and print mathematical equations. In order to properly display larger or more complex equations, certain mathematical characters may be required to grow either horizontally or vertically to accommodate the components of the equation. For example, a set of parentheses may need to grow vertically or horizontally to accommodate a lengthy expression. Similarly, a square root radical symbol may need to be enlarged in a vertical or horizontal direction to match the size of the argument under the radical. Other such mathematical characters include square or curly braces (both horizontal and vertical), arrows, accents, etc.

While typical fonts may contain numerous mathematical characters of various sizes, it is not possible to include predefined variants for every possible desired character and size. Furthermore, while it is possible to copy a single mathematical character into a graphics program and stretch that character using conventional means, current formula editors (such as those found within word processing programs) do not provide for stretching a single character within a formula. Rather, each character is part of a font, such as a true type font, and there is currently no font that provides for enlarging or growing a character in one direction (i.e., either vertically or horizontally) relative to the remaining characters within the font.

SUMMARY

The above and other problems are solved by systems and methods for enlarging a character within a document, such as a single mathematical character within a formula. In embodiments, a desired size for the character is determined and a further determination is made as to whether a font associated with the character also contains existing or predefined variants of the character having the desired size. If it is determined that the font does not include any predefined variants of the character having the desired size, the character is assembled from a plurality of component parts or "glyphs" that are stored with the font (a "glyph" is a graphical representation of a character or a part of a character that is stored in a font). These component glyphs may include a plurality of extenders that are added to the assembled character in order to achieve the desired size. Additionally, in one embodiment, each component glyph includes at least one straight line connector, wherein the neighboring connector parts are overlapped an equal amount in order to maintain the symmetry of the enlarged character.

In another embodiment, a font includes tables containing records of enlarged variants for a particular font character, as well as part records for component glyphs used to assemble the enlarged character when no predefined variant having the desired size is available. In one embodiment, the tables include count values of characters that may be enlarged in either a vertical or horizontal direction. The tables may also include an advance value for each component glyph (designating the distance the glyph extends in either the vertical or horizontal direction), as well as a minimum overlap value for the connectors at the end(s) of the individual component glyphs.

The various exemplary embodiments described below may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features and advantages will be apparent from a reading of the following detailed description and a review of the associated drawings. While this Summary is provided to introduce a selection of concepts in a simplified form that are further described below, it is not intended to identify essential features of the claimed subject matter, nor is it intended to be used as an aid in determining the scope of the claimed subject matter.

BRIEF DESCRIPTION OF THE DRAWINGS

FIG. 1 is an exemplary equation illustrating the need for the present invention.

DETAILED DESCRIPTION

FIGS. 1A and 1B illustrate the need for mathematical characters that have the capacity to grow in order to encompass extended data or arguments within an equation. In particular, equation 102 in FIG. 1A is an example of a function $f(x)$ that takes on different formulas depending on the value of its argument, x. The standard size curly brace 104 in FIG. 1A is too small to fully delineate the values that $f(x)$ may take. The equation 112 in FIG. 1B illustrates the same function using a properly sized, larger curly brace 114. The curly brace 114 is tall enough to encompass the entire equation. While some TrueType fonts may include character variants of different sizes (such as the curly brace), it is unlikely that the static list will include a variant of precisely the right size to fully encompass the equation data or arguments. Rather, it is likely that a user will be required to compromise and be forced to select a character size (e.g., a height of a left brace or a length of a square root symbol) that is either too large or too small.

Embodiments of the present invention add information to certain OpenType or TrueType fonts to provide for growing or stretchable characters. In one embodiment, the added information relates to mathematical characters such as parentheses, curly braces, square root radicals, etc. As described below, one embodiment of the invention adds information to an OpenType or TrueType font by including new tables that provide for the direct creation of an enlarged mathematical character using only the information stored in the tables. In an embodiment, the font also includes additional tables that detail the building blocks or "glyphs" of each character that is capable of growing, as well as an algorithm for assembling the pieces within the glyph set to construct a character of a given height or length. These tables and algorithms are described in greater detail below.

Figure 2:
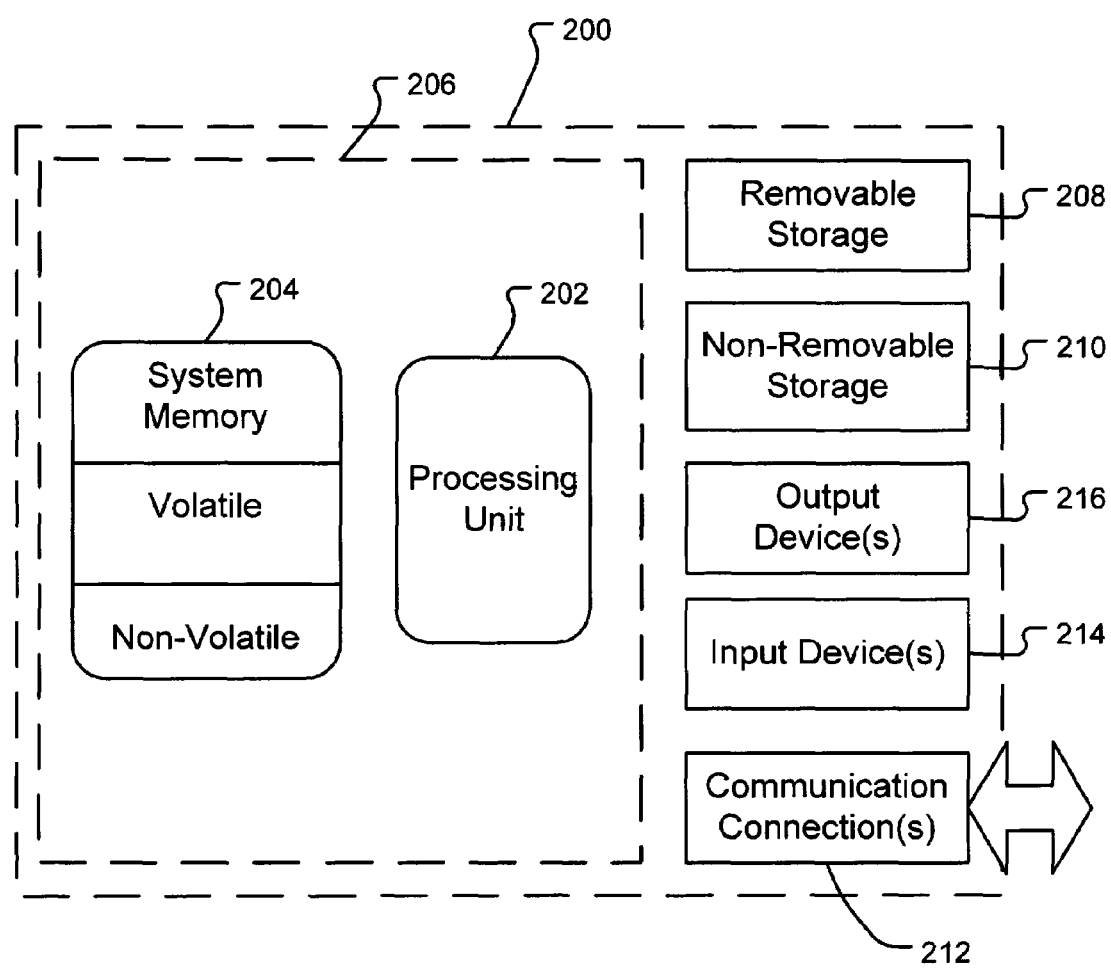
FIG. 2 illustrates an example of a suitable computing system environment on which an embodiment of the present invention may be implemented.

FIG. 2 is provided to illustrate an example of a suitable computing system environment 200 on which embodiments of the present invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200.

System 200 may also contain a communications connection(s) 212 that allows the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term "computer readable media" as used herein includes both storage media and communication media.

In accordance with an embodiment, the system 200 includes peripheral devices, such as input device(s) 214 and/or output device(s) 216. Exemplary input devices 214 include, without limitation, a keyboard, computer mouse, pen, or stylus, voice input device, tactile input device and the like. Exemplary output device(s) 216 include, without limitation, devices such as displays, speakers, and printers. For the purposes of this invention, the display is a primary output device. Each of these devices is well known in the art and, therefore, not described in detail herein.

Figure 3:
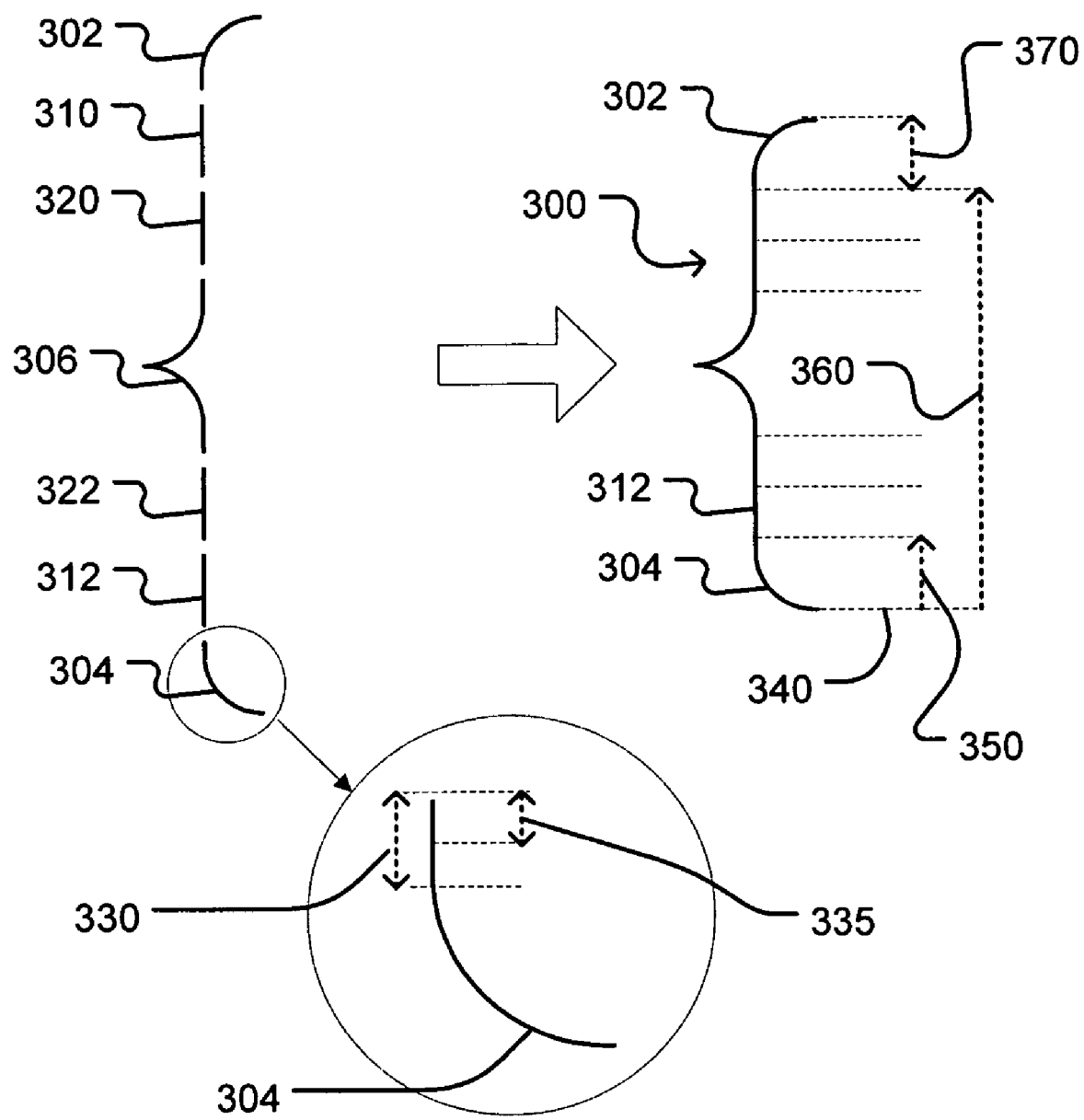
FIG. 3 illustrates the assembly of an enlarged mathematical character from character parts in accordance with an embodiment of the present invention, with a portion enlarged to better illustrate a component glyph of the enlarged character.

FIG. 3 illustrates an enlarged character formed according to an embodiment of the present invention. In the particular embodiment shown, a left curly brace 300 is built from smaller component parts or glyphs. As used herein, a "glyph" is a graphical representation of a character or a part of a character. In particular, a glyph is stored within a font (i.e., within a font table), and the present invention relates to the selection and combination of multiple glyphs in order to produce graphical representations of enlarged characters. In an embodiment, the left curly brace 300 is constructed from at least three component glyphs: a top curve glyph 302, a bottom curve glyph 304, and a center piece glyph 306. Each of the three glyphs 302, 304 and 306 include a straight connector portion at either one end (in the case of the top and bottom curves 302 and 304) or both ends (in the case of the center piece 306) to allow for connecting with adjacent glyphs. That is, each glyph acts as a building block for the entire character, and the straight ends on the glyphs act like "connectors" for combining the glyphs together. An exemplary connector for the bottom curve glyph 304 is designated by the arrow 330 in the enlarged portion of FIG. 3.

In an embodiment, each straight end connector overlaps its neighbor by a predetermined minimum amount to account for rounding errors when the character is displayed at lower resolutions. The enlarged portion of FIG. 3 includes an arrow 335 that illustrates an exemplary minimum overlap value at the end of the straight line connector 330. In one particular embodiment, a "MinConnectorOverlap" value designating the predetermined amount of minimum overlap is stored in a table associated with the OpenType font, as described in greater detail below.

While the overlap between connectors can be increased from its minimum value in order to reduce the overall size of the character, it is the minimum overlap that defines the maximum size of the character. For example, while the bottom curve glyph 304 could overlap a neighboring glyph by an amount equal to the entire length of the connector 330 in order to minimize the overall size of the character, a reduction in the amount of overlap (i.e., to the minimum overlap designated by the arrow 335) would maximize the overall size of the assembled character.

In cases where the connector overlap is set to its minimum value and the overall character size is too small for a desired purpose, straight line extenders may be added to the character to increase its overall length or height. In the example shown in FIG. 3, upper extender 310 and lower extender 312 are initially added to either side of the center piece 306 to increase the height of the left curly brace 300. For characters having a predefined symmetry, such as the curly brace 300, the extenders are preferably added in pairs to ensure that the height (or length) of a character is increased equally while maintaining the symmetry of the character.

Once the extenders 310 and 312 have been added to the curly brace 300, the connector overlaps between all adjacent component glyphs may be maximized in one embodiment of the invention to determine a minimum expanded size for the character. If the overall size of the newly extended character is not sufficient for the desired purpose, the connector overlaps are again preferably reduced to their minimum value to determine the largest possible size of the assembled character. This maximum overall character size is then compared to the desired value to determine whether additional extender pieces are required. In the case of FIG. 3, if it is determined that the size of the brace 300 is still too small with the first set of extenders 310 and 312 in place (i.e., the height is insufficient to encompass the different equations shown in FIG. 1), additional extenders 320 and 322 may be added, as shown in FIG. 3.

Once a sufficient number of extenders have been added to meet the desired height or length of the extended character, the overlap between the various straight line segments may be adjusted to fine tune the character size. That is, if the minimum connector overlap would produce a character size that is too large, the degree of overlap may be increased at each overlapping segment until the desired size is achieved. As described above, the amount of overlap at each segment should be substantially identical in order to maintain the overall symmetry of the stretched character. Furthermore, while a vertically-oriented character is described in FIG. 3, a horizontally-oriented character (such as a horizontal brace or a square root symbol) may also be extended through the use of horizontal extenders.

Following the determination of the appropriate connector overlap values, the character is assembled by combining the different component glyphs. In one embodiment, vertical characters are assembled from the bottom up, while horizontal characters are assembled left to right. In an embodiment, each component glyph is assigned an "offset" or starting point from a reference or zero position within the equation. Additionally, each component glyph is assigned a total "advance height/width" that may be used to determine the total size of the component in the direction of interest. In the example shown in FIG. 3, the first glyph 304 (the bottom curve) of the assembled curly brace 300 is positioned at a reference level 340, while the next glyph in the assembly (the extender 312) is positioned vertically above the first glyph 304 at an offset height 350 above the reference level 340. As described above, the offset height 350 is determined after calculation of the appropriate connector overlap between the glyphs 304 and 312.

Similarly, the additional component glyphs (322, 306, 320, 310 and 302) for the curly brace 300 are assembled at greater offset heights, as designated by the additional dashed lines shown in FIG. 3 (not numbered). The final component of the assembled character 300 (the top curve 302) is positioned at an offset height 360 above the reference level 340, and the glyph 302 includes an advance height that is designated by the arrow 370 in FIG. 3. Thus, the overall height of the assembled character 300 is easily determined by adding the offset 360 of the last component glyph with the advance height 370 of the same glyph.

Figure 4:
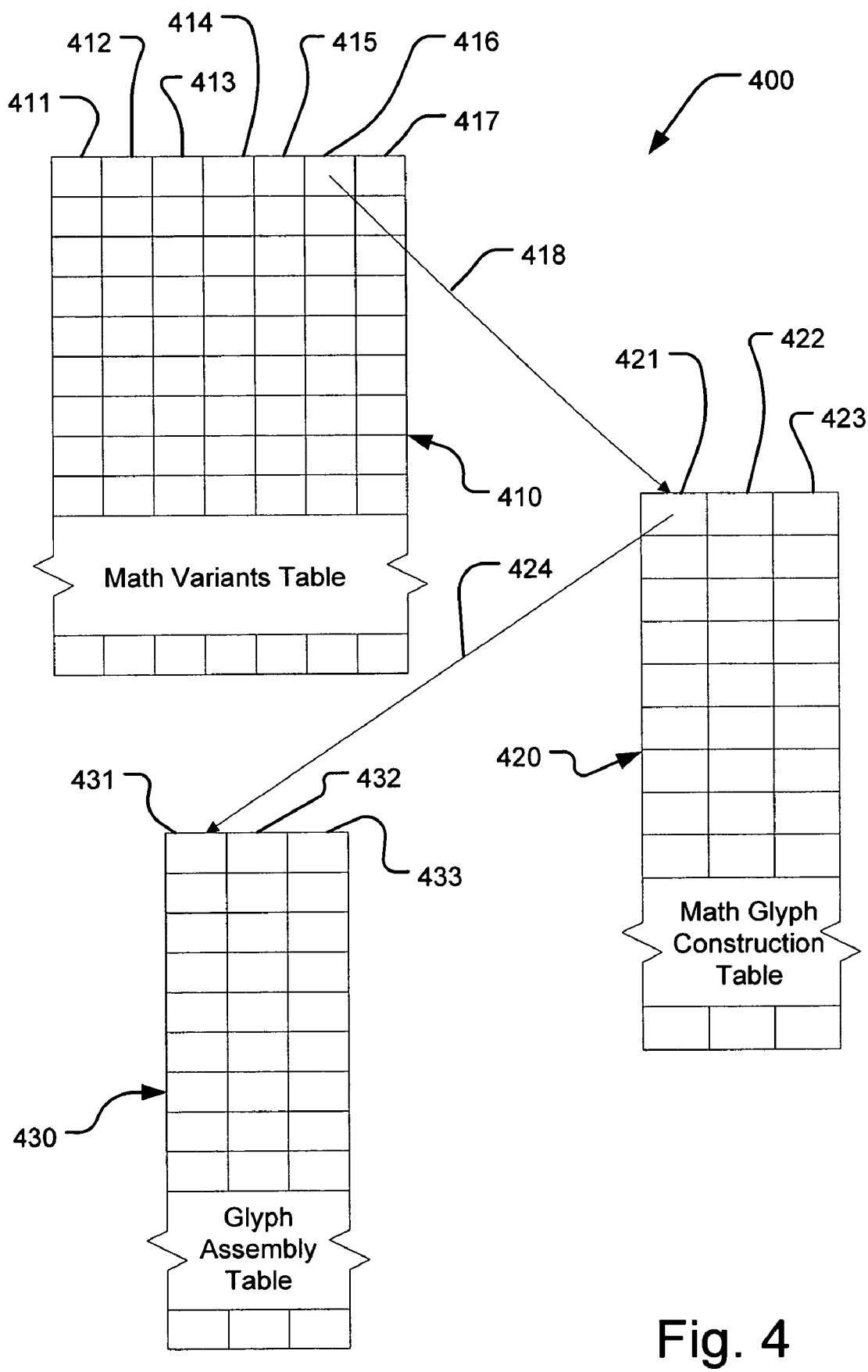
FIG. 4 illustrates three tables incorporated into a font in accordance with one embodiment of the present invention.

FIG. 4 illustrates a set of tables 410, 420, and 430 containing information on how to assemble a large mathematical character (i.e., an expanded variant of a standard character such as the curly brace 300 shown in FIG. 3). The first table 410, termed the "Math Variants Table," includes a number of fields, some of which link to (i.e., provide pointers to) the table 420, termed the "Math Glyph Construction Table." As described below, the Math Glyph Construction Table 420, in turn, provides pointers to the third table 430, termed the "Glyph Assembly Table." In one embodiment, the tables 410, 420 and 430 are used to either locate or build a character having a certain width or height. Toward that end, the tables include data regarding the size of various static or "stock" versions of a character that are contained within a specific font, as well as data regarding the various building blocks or glyphs used to construct an enlarged version of the character if none of the stock sizes are deemed suitable.

In one embodiment, the tables 410, 420 and 430 may be included with additional tables, such as the known tables within an OpenType or TrueType font that describe glyph information for characters as well as other font parameters. Additionally, the tables 410, 420 and 430 may comprise a portion of a larger math table (not shown) that includes additional positioning information for mathematical characters, or the information within the tables 410, 420 and 430 may be consolidated within a single table or array. However, for purposes of the present discussion, it is assumed that the data used for selecting or assembling enlarged mathematical characters is contained within three separate tables as shown in FIG. 4 and described below.

In an embodiment, the Math Variants Table 410 includes a first field 411 that contains the above-described MinConnectorOverlap value. This value defines a predetermined minimum amount of overlap for each connector or straight end of a glyph used to build the character (to account for rounding errors when the character is displayed at lower resolutions). The MinConnectorOverlap value is typically expressed in design or "em" units, which are familiar to those skilled in the art of font design.

Two additional fields 412 and 413 within the table 410 include information about the count and coverage of various characters that can grow in the vertical direction. For example, field 412 may provide a count number for a character or glyph that provides for growth in the vertical direction, while field 413 may provide data regarding positioning information and coverage of the character identified in field 412. In one embodiment, the field 413 may simply provide a pointer to another math table (not shown) that provides the vertical coverage data for the particular character. Similarly, fields 414 and 415 within the Math Variants Table 410 include the same type of count and coverage information for characters that can grow in the horizontal direction.

Fields 416 and 417 within the Math Variants Table 410 provide, in one embodiment, an array of pointers to the Math Glyph Construction Table 420. In particular, the field 416 may provide an array of pointers to the table 420 for characters or shapes that grow in the vertical direction, while field 417 may provide an array of pointers to the table 420 for characters or shapes that grow in the horizontal direction. An exemplary pointer from the field 416 to the table 420 is indicated by arrow 418 in FIG. 4.

The Math Glyph Construction Table 420 provides information on finding or assembling extended variants for a particular character or glyph. It can be used both for shapes that grow in the horizontal and vertical direction. In one embodiment, a first field 421 in the Math Glyph Construction Table 420 provides a pointer to the Glyph Assembly Table 430 that specifies how the shape for this mathematical character can be assembled from parts found in the glyph set of the font. The pointer to table 430 is illustrated by arrow 424 in FIG. 4, and details of the table 430 are provided below. If the particular mathematical character cannot be assembled (i.e., no collection of parts exists for the character), then the pointer in field 421 will be set to NULL.

In one embodiment, the Math Glyph Construction Table 420 further contains field 422 that provides a count of predefined or "stock" variants for the specified character, as well as field 423 that provides a record of the stock glyph variants. In an embodiment, the record contained within field 423 includes an index or ID for the particular character variants, as well as an "advance measurement" of the character's height (or width) in the vertical (or horizontal) direction of extension.

The inclusion of both the field 421 (containing a pointer to the Glyph Assembly Table 430), as well as the fields 422 and 423 (containing information on stock variants for the character) recognizes that a particular font may provide several different sizes for a character, such as the curly brace 300, but that larger or custom character sizes may also be created by assembling component pieces found in a glyph set. Thus, the client typesetting application (e.g., the word processor or spreadsheet application) is responsible for first checking the variants provided in the font and choosing one of the stock variants if it is of an appropriate size. In those instances where the required height or length of the character is greater than all of the available glyph variants, then the additional data contained within the tables 420 and 430 is utilized to assemble the glyph components and produce an appropriately sized character (e.g., an enlarged curly brace as shown in FIG. 3).

The Glyph Assembly Table 430 specifies how the shape for a particular character can be constructed from component parts found in the glyph set. For example, the table 430 may contain information about a sequence of parts or component glyphs that together comprise the desired character. In an embodiment, the table 430 contains at least three fields. A first field 431 contains an italics correction for the assembly. That is, due to the frequent use of italics in math formulas, a correction value is used to account for the resulting slant to the right when a character is placed in an italics font. Specifically, the italics correction is a measurement of how slanted the glyph is, and how much its top part protrudes to the right. Thus, for example, taller letters tend to have larger italics correction, and a "V" will typically have a larger italics correction than an "L." In an embodiment, the italics correction is a fixed value that does not depend on the overall size of the stretched character.

The Glyph Assembly Table 430 next includes field 432 that provides a count of the number of parts or component glyphs for a particular character, as well as field 433 which defines an array of part records used in forming the assembly. In one embodiment, the part record for each component glyph includes a glyph ID as well as a length for each "connector" at the end(s) of the glyph. As described above, connectors are the straight line portions at one or both ends of a glyph that can be used to link the component glyph with a preceding or next glyph within the assembly (such as the connector 330 shown in FIG. 3). The connectors of neighboring parts overlap to provide the client typesetting application with a certain degree of flexibility when combining the glyphs. Additionally, each connector pair must overlap a predetermined minimum amount (the above-described MinConnectorOverlap value) to account for rounding errors when the character is displayed at lower resolutions. In those instances when a component part does not have a connector on one end (e.g., the end opposite the connector 330 on the bottom curve 304 in FIG. 3), the corresponding connector length for that end is set to zero in the glyph part record.

In addition to detailing the lengths of each glyph connector, the glyph part record also includes a "full advance" value for each component glyph. The full advance value defines the total size (e.g., height or length) of the component in the direction of enlargement and is used, as described below, to measure the overall size of the assembled character. Specifically, while each character in the assembly is given a starting value or "offset" that defines its vertical/horizontal location in the assembly, the overall size of the assembled character is simply calculated by adding the full advance value of the final component glyph to the offset value for the same component. This calculation is described above with respect to FIG. 3.

In one embodiment, the part record for each component glyph also includes a flag that indicates whether the component piece is used as an "extender," i.e., a part that can be repeated multiple times within the assembly or skipped altogether for smaller assemblies. Extenders are typically vertical or horizontal bars having an appropriate thickness to be seamlessly integrated with the core component glyphs of a character, such as the vertical extenders 310, 312, 320 and 322 shown in FIG. 3.

The data provided within the Glyph Assembly Table 430 allows a client typesetting application (such as a word processor) to build custom-sized characters by first determining the number of component glyphs required to build a character of a desired size, and then drawing each separate glyph at a predetermined offset, as described above and shown in FIG. 3. In an embodiment, the above-described part records for each glyph are contained in an array and are ordered in the same order as the glyphs used to assemble the character. Thus, in one embodiment, the array of component glyph records are ordered from left to right for a horizontally growing character, and from bottom to top for a vertically growing character.

As described above, a given font may include a plurality of character variants of predetermined sizes. For example, the font may specify several sizes of curly braces, as well as provide a Glyph Assembly Table 430 containing data for constructing larger curly braces by stacking component glyphs (as shown in FIG. 3). Thus, in one embodiment, the client typesetting application (e.g., a spreadsheet or a word processor) is expected to first choose one of the provided variants if the variant is of the desired height or width. However, if none of the stock variants are of an appropriate size, the above-described mechanism is employed to typeset the large character as an assembly of glyphs. One embodiment of an algorithm used to construct an enlarged character is described below with respect to FIGS. 5 and 6.

Figure 5:
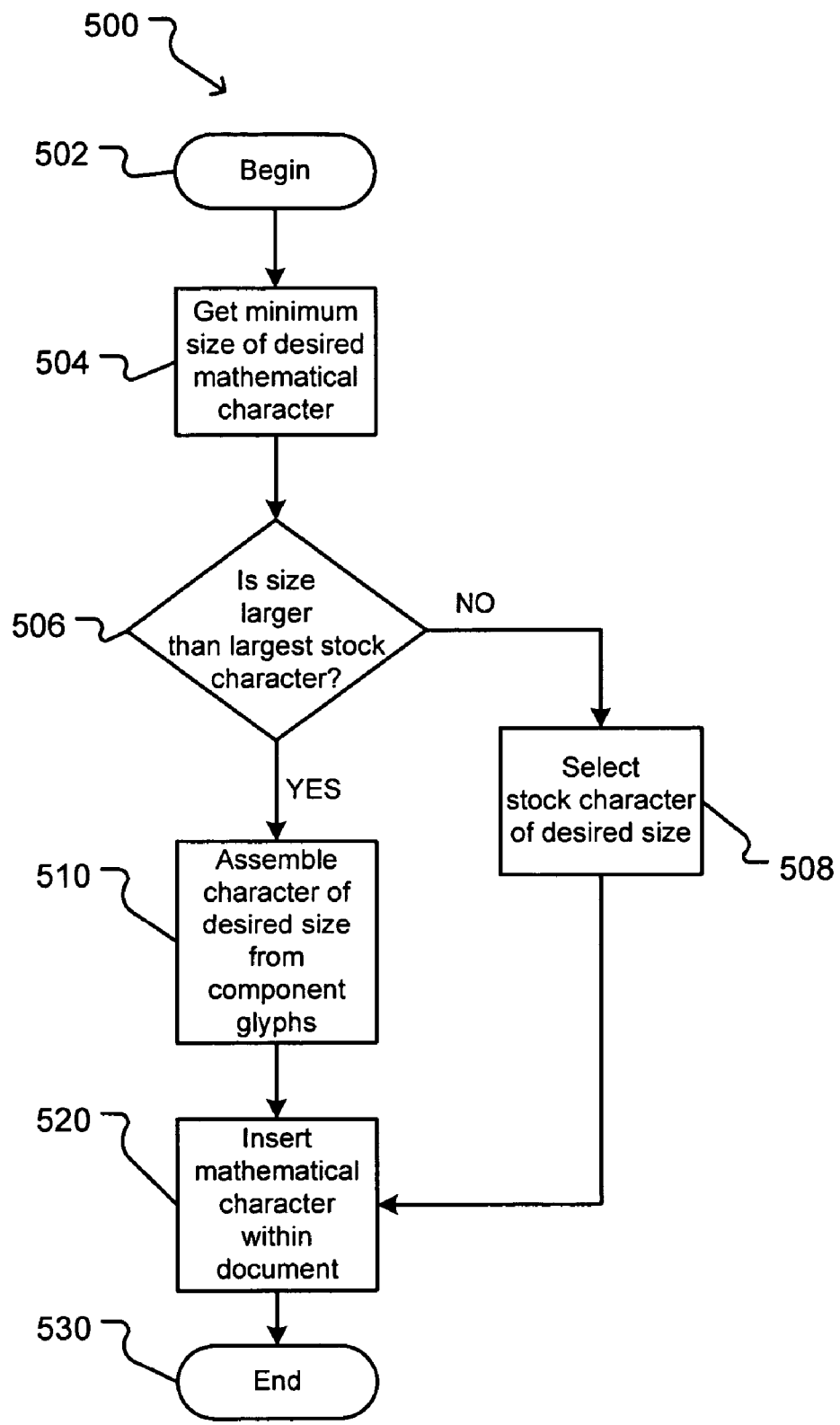
FIG. 5 is a flow diagram illustrating operational characteristics of a process for inserting an enlarged mathematical character into a document in accordance with an embodiment of the present invention.

FIG. 5 illustrates an operational flow 500 for initially determining whether to use an existing character or build a larger character (e.g., the curly brace 300 shown in FIG. 3). The flow starts with begin operation 502 and proceeds to get operation 504 which determines the minimum size for the desired character. Flow then proceeds to determination 506 which determines whether the desired character size is larger than the largest predefined variant contained within the font tables. If not, flow branches NO to select operation 508 to select the appropriate character variant of the desired size. However, if the size of the needed character is larger than the largest predefined character variant, flow from determination 506 branches YES to assemble operation 510 where the enlarged character is assembled using the data contained within the Glyph Assembly Table 430. After the character has been either selected in operation 508, or assembled in operation 510, flow continues to insert operation 520 where the resulting character is inserted within a formula or other location in a document. The flow then ends with operation 530.

Figure 6:
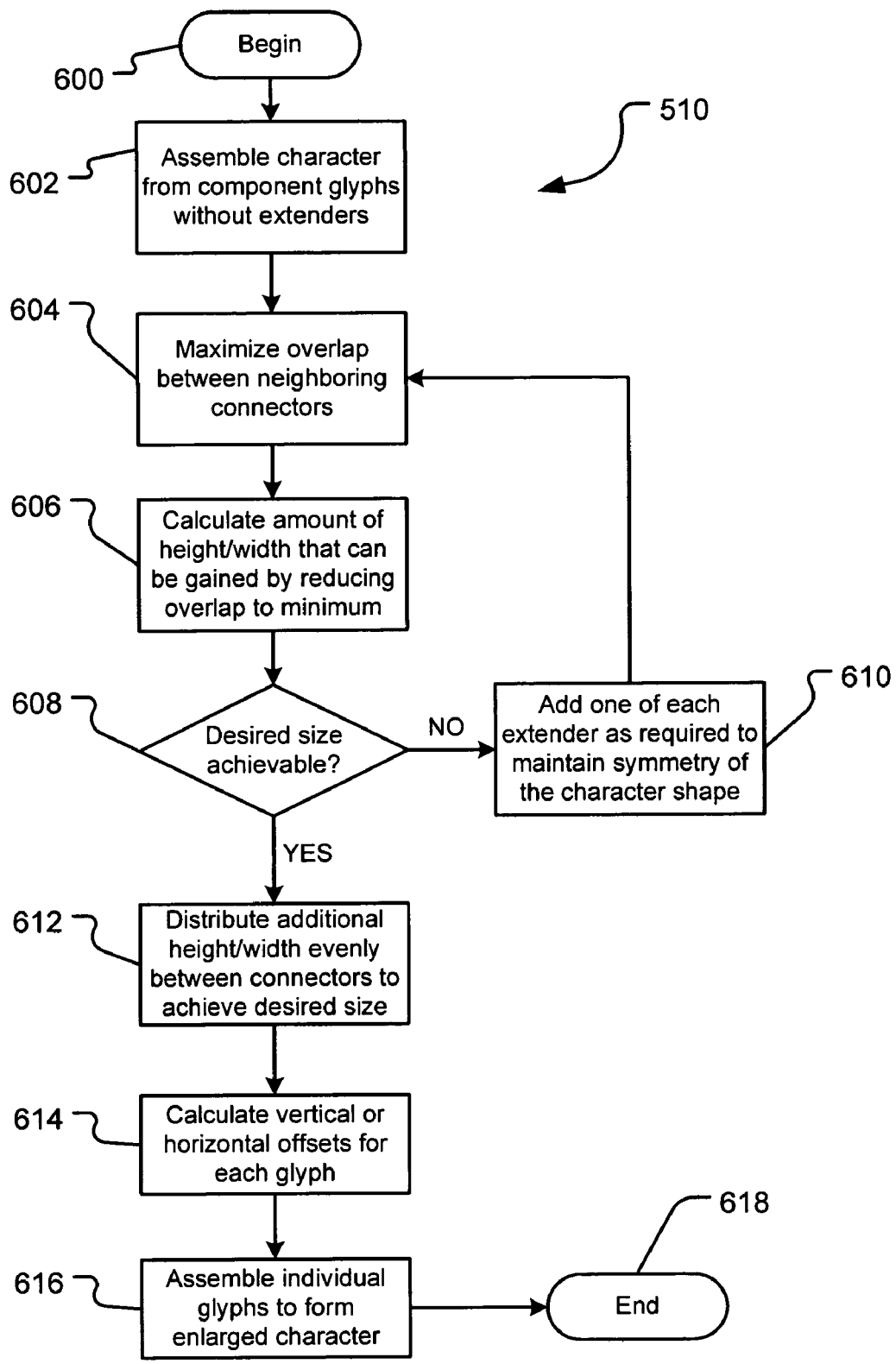
FIG. 6 is a flow diagram illustrating operational characteristics of a process for assembling an enlarged mathematical character in accordance with an embodiment of the present invention.

FIG. 6 illustrates an operational flow of one embodiment of the assembly process 510 for constructing a large or expanded character. Following begin operation 600, initial assembly operation 602 assembles the basic component glyphs of the character without any extenders. Thus, in the example shown in FIG. 3, the initial assembly operation 602 operates to assemble only the bottom curve 304, the center piece 306, and the top curve 302. Next, maximize operation 604 overlaps all the neighboring connectors to the maximum extent possible (i.e., one connector completely overlaps an adjacent connector). The result of operation 604 is the smallest possible version of the desired character which is used as a baseline for the following calculations.

Calculate operation 606 next determines the amount of additional size (i.e., height or width) that could be achieved by reducing the overlap between connectors to the minimum possible amount. In one embodiment, this minimum amount of overlap is stored in the Math Variants Table 410 as the MinConnectorOverlap value. Thus, the calculation operation 606 simply determines the maximum amount the character can be grown by minimizing the overlap between the component glyphs. Decision operation 608 then determines whether the size calculated in operation 606 meets the size called for by the client typesetting application. If not, flow branches NO to add operation 610 which adds one of each extender to the character, and the process flow then repeats from maximize operation 604. As described above, for symmetrical characters, such as the curly brace 300 shown in FIG. 3, the extenders are preferably added in pairs to ensure that the symmetry of the character is maintained while increasing the overall height or length of the character. Thus, in the example shown in FIG. 3, the first instance of the operation 610 would add the extenders 310 and 312 to the curly brace 300. Of course, non-symmetrical characters, such as a square root radical sign, would only require the addition of a single extender in operation 610.

Once a sufficient number of extenders have been added to achieve the desired size in determination 608, flow branches YES to distribute operation 612, which distributes connector overlaps evenly among all the glyphs to achieve the desired size. That is, the desired size may be achieved by a level of connector overlap somewhere between the minimum and maximum possible values. In order to maintain the symmetry of the assembled character, this overlap must be equally distributed between all of the connectors. Next, calculate operation 614 determines the individual positional offsets for each of the component glyphs (i.e., determines an offset from a zero reference level, as shown in FIG. 3). Utilizing the offset information calculated in operation 614, assembly operation 616 assembles the component glyphs into the final, enlarged character. Flow ends with operation 618 where the assembled character is inserted within the document, as described in operation 520 in FIG. 5.

Figure 7:
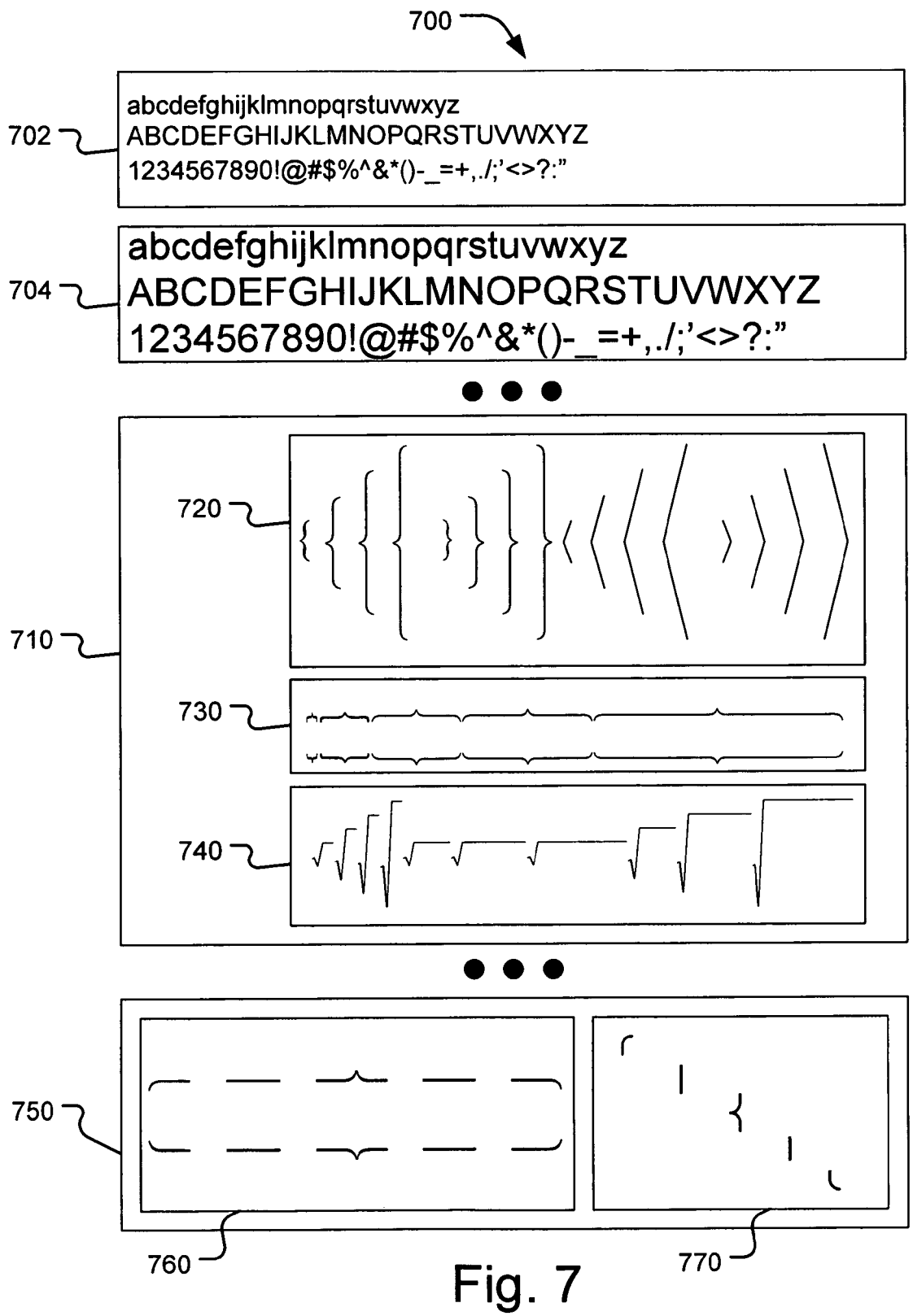
FIG. 7 illustrates examples of information contained in tables within a font in accordance with an embodiment of the present invention.

FIG. 7 illustrates examples of some of the information contained within the font tables in accordance with one embodiment of the present invention. In addition to standard alphanumeric character sets 702 and 704 of various sizes, an OpenType or TrueType font according to the present invention may contain a number of sets of predefined variant characters having predetermined sizes. For example, FIG. 7 illustrates a set 710 of variants which include, in one exemplary embodiment, a set 720 of left and right braces (both curly and straight), a set 730 of horizontal curly braces (both upper and lower), and a set 740 of square root radical symbols. Additionally, a set 750 of glyphs representing component parts of various mathematical characters are added to the font in accordance with embodiments of the present invention. By way of example, and not of limitation, the set 750 of glyphs includes a set 760 representing the parts of both a top and bottom horizontal curly brace, as well as a set 770 containing component parts of a left curly brace (similar to those component parts illustrated in FIG. 3).

Thus, as a result of including the tables 410, 420 and 430 to a particular font, such as an OpenType or TrueType font, a client typesetting application is provided with the ability to either select pre-existing variants of a particular character or assemble a larger version of the character from component glyphs defined in the tables. However, the present invention is not limited to the embodiments of the tables 410, 420 and 430 shown in FIG. 4 and described above. Rather, the present invention encompasses the inclusion of the needed information within the font itself so that the typesetting application can easily access the information for the selected font.

Although the present invention has been described in language specific to structural features, methodological acts, and computer readable media containing such acts, it is to be understood that the present invention defined in the appended claims is not necessarily limited to the specific structure, acts, or media described. Rather, the specific features and acts described above are disclosed as example forms of implementing the claims, and one skilled in the art will recognize other embodiments or improvements that are within the scope and spirit of the present invention.

For example, while an embodiment of the present invention has been described with respect to OpenType or TrueType fonts, it should be appreciated that the present invention is applicable to other fonts which may modified to include information, such as character variants and component glyphs, for creating an enlarged character. Additionally, while the above description and drawings illustrate the use of the present invention with certain mathematical characters, the present invention may be utilized to enlarge other types of characters in at least one direction. Furthermore, the computing system 200 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems, and the like.

What is claimed is:

1. A computer readable medium having computer-executable instructions for performing a method of enlarging a character within a document, wherein the character is a component of a predetermined font, the method comprising:

determining a desired size for the character;

determining whether the predetermined font includes existing variants of the character having the desired size;

upon determining that the predetermined font does include a variant of the character having the desired size, selecting the variant for insertion within the document; and upon determining that the predetermined font does not include a variant of the character having the desired size, assembling a character of the desired size from a plurality of component glyphs stored within the predetermined font, wherein each component glyph includes at least one straight line connector for overlapping a connector of an adjacent component glyph, and wherein the step of assembling the character further comprises:

maximizing an amount of overlap between neighboring connectors at each end of adjacent component glyphs to minimize an overall size of the connector;

calculating a potential increase in character size resulting from reducing the amount of connector overlap from the maximum amount to a predetermined minimum amount of overlap, wherein the predetermined minimum amount is greater than zero; and determining if the potential increase in character size is equal to or greater than the desired character size.

2. A computer readable medium as defined in claim 1, wherein assembling the character further comprises:

upon determining that the potential increase in character size is equal to or greater than the desired character size, reducing the overlap between adjacent connectors by a substantially equal amount until the desired character size is achieved.

3. A computer readable medium as defined in claim 1, wherein assembling the character further comprises:

upon determining that the potential increase in character size is not equal to or greater than the desired character size, adding at least one extender glyph to the character to increase the overall size of the character.

4. A computer readable medium as defined in claim 3, wherein the extender glyph comprises a straight line segment having a connector at each end.

5. A computer readable medium as defined in claim 4, wherein two extender glyphs are added to a character when the character is symmetrical about a center point, wherein one extender glyph is added on each side of the center point to maintain symmetry of the character.

6. A computer readable medium as defined in claim 3, further comprising:

repeating the step of adding an extender glyph to the character until a determination is made that the potential increase in character size resulting from reducing the amount of connector overlap to the predetermined minimum amount is equal to or greater than the desired character size; and reducing the overlap between adjacent connectors by a substantially equal amount until the desired character size is achieved.

7. A computer readable medium as defined in claim 6, wherein:

the character is a mathematical character; and the predetermined font is one of an OpenType or a TrueType font.

8. A computer readable medium as defined in claim 7, wherein the character is enlarged in one of a vertical or horizontal direction.

9. A computer readable medium having computer-executable instructions for generating an enlarged version of a specified character within a predetermined font, wherein the specified character is enlarged in at least one of a vertical or horizontal direction, and wherein the computer-executable instructions define data structures within the predetermined font comprising:

a first data field containing a record of predefined enlarged variants for the specified character; and a second data field containing a pointer to a glyph assembly table for the specified character, wherein the glyph assembly table contains information about a sequence of component glyphs used to assemble an enlarged version of the specified character, the glyph assembly table including an array of component glyph records comprising:

a first value representing a glyph identifier for each component glyph;

a second value representing a length of a connector at one end of the component glyph;

a third value representing a length of a connector at an opposite end of the component glyph, wherein the third value may be zero if the component glyph only includes a single connector;

a fourth value representing a full advance measurement for one of a height or length of the component glyph; and a fifth value indicating whether the component glyph is an extender that can be repeated during assembly of the specified character, wherein the extender adds length or width in order to achieve a desired size of the specified character.

10. A computer readable medium as defined in claim 9, wherein the data structures defined within the predetermined font further comprise:

a third data field containing a count of font characters that are capable of growing in a vertical direction; and a fourth data field containing a count of font characters that are capable of growing in a horizontal direction.

11. A computer readable medium as defined in claim 9, wherein the record contained within the first data field includes an advance measurement in one of the vertical or horizontal directions for the predefined enlarged variant of the specified character.

12. A computer readable medium as defined in claim 9, wherein the data structures defined within the predetermined font further include a value representing a minimum amount by which connectors of neighboring component glyphs must overlap during assembly of the specified character.

13. A computer readable medium as defined in claim 9, wherein:

the specified character is a mathematical character; and the predetermined font is one of an OpenType or a TrueType font.

14. A computer readable medium having computer-executable instructions for generating an enlarged version of a specified character within a predetermined font, wherein the specified character is enlarged in at least one of a vertical or horizontal direction, and wherein the computer-executable instructions define a plurality of tables included with the predetermined font, the plurality of tables comprising:

a first table including a first count of font characters that are capable of growing in a vertical direction and a second count of font characters that are capable of growing in a horizontal direction;

a second table including a count of component glyphs that are used to assemble an enlarged version of the specified character, the second table further including an array of component glyph records describing each component glyph used to assemble the enlarged version of the specified character, the array comprising a first value representing a glyph identifier for each component glyph, a second value representing a length of a connector at one end of the component glyph, a third value representing a length of a connector at an opposite end of the component glyph, wherein the third value may be zero if the component glyph only includes a single connector, a fourth value representing a full advance measurement for one of a height or length of the component glyph, and a fifth value indicating whether the component glyph is an extender that can be repeated during assembly of the specified character, wherein the extender adds length or width in order to achieve a desired size of the specified character; and a third table including a record of predefined enlarged variants for the specified character, the third table further including a pointer to the second table for the specified character; and wherein the first, second and third tables enable a typesetting application utilizing the predetermined font to alternatively select a predefined enlarged variant of the specified character or assemble an enlarged version of the specified character from component glyphs, wherein the assembled version of the specified character has a desired size that is not represented within the predefined enlarged variants.

15. A computer readable medium as defined in claim 14 wherein:

the predetermined font is one of an OpenType or a TrueType font; and the first table further includes a value representing a minimum amount by which connectors of neighboring component glyphs must overlap during assembly of the specified character.

\* \* \* \* \*